United States Patent
Sisko et al.

(10) Patent No.: US 7,320,428 B2
(45) Date of Patent: Jan. 22, 2008

(54) CREDIT CARD ACCOUNT REWARD SYSTEM AND METHOD

(75) Inventors: Michael A. Sisko, Windermere, FL (US); Julian M. Benscher, Windermere, FL (US)

(73) Assignee: American DreamCard, LLC, Windermere, FL (US)

( * ) Notice: Subject to any disclaimer, the term of this patent is extended or adjusted under 35 U.S.C. 154(b) by 0 days.

(21) Appl. No.: 10/652,475

(22) Filed: Aug. 29, 2003

(65) Prior Publication Data

US 2004/0044577 A1 Mar. 4, 2004

Related U.S. Application Data

(60) Provisional application No. 60/408,135, filed on Sep. 4, 2002.

(51) Int. Cl.
*G07F 19/00* (2006.01)

(52) U.S. Cl. .................... 235/379; 705/14

(58) Field of Classification Search ........... 235/379, 235/381, 383; 705/14
See application file for complete search history.

(56) References Cited

U.S. PATENT DOCUMENTS

| | | | |
|---|---|---|---|
| 6,018,718 A | 1/2000 | Walker et al. | |
| 6,128,599 A | 10/2000 | Walker et al. | |
| 6,327,573 B1 | 12/2001 | Walker et al. | |
| 2002/0187779 A1* | 12/2002 | Freeny, Jr. | 455/422 |

* cited by examiner

*Primary Examiner*—Karl D. Frech
(74) *Attorney, Agent, or Firm*—Oppenheimer Wolff & Donnelly LLP

(57) ABSTRACT

The present invention relates generally to a credit card holder awards system and method. Specifically, the present invention relates to a method and system that monitors customer activity at regular intervals, selects an award winner from among the customers based on a predetermined criteria, and determines an award amount based on a percentage of the net transaction revenue from the customer's portfolio for a specific interval.

40 Claims, 2 Drawing Sheets

US 7,320,428 B2

CREDIT CARD ACCOUNT REWARD SYSTEM AND METHOD

CROSS REFERENCE TO RELATED APPLICATION

This application claims the priority of U.S. Provisional Ser. No. 60/408,135, filed on Sep. 4, 2002.

FIELD OF THE INVENTION

The present invention relates generally to an awards program for a defined customer group and a method for carrying out the program. Specifically, the present invention relates to a method and system that monitors customer activity within a customer portfolio at regular intervals, selects an award winner from among the customers in the portfolio based on a predetermined criteria, and may determine an award amount based on the net transaction revenue of the customers in the portfolio. By providing a recurring customer award program based on portfolio-level activity, the present invention creates loyalty incentives in a manner that generates customer enthusiasm and offers high-level rewards.

BACKGROUND OF THE INVENTION

Customer award programs are implemented by many different organizations as a means to create loyalty and enhance customer activity. One example of such a customer awards program exists in the credit card industry where customers obtain points for card usage. The points are then redeemable through some means for specific products or awards of cash or credit.

Other awards programs in the credit card field are based on either the individual customer's annual card usage—resulting in a year-end reimbursement—or a specific purchase made with the card—resulting in a free purchase. In sum, these systems offer a customer (1) a fixed return based directly on the customer's purchases, (2) fixed redeemable "points", or (3) a chance to have the credit card company cover the costs of a particular card transaction, or specified set of transactions. Alternatively, some other industries may provide rewards based on customers' continued purchases or activity. For instance, it is common for airlines to award "miles" to its customers as a reward for flying, such that the miles are redeemable for free or discounted travel services. Similarly, retail stores may award points to members of a loyalty program for their purchases, where the points may be used for products at the store.

All of these programs are based on the customers' personal transactions; i.e., the amount "awarded" is based on each individual customer's purchases. For instance, an individual's credit card may reimburse 0.5% of his or her purchases at the end of the year through cash/credit/points. Likewise, customers receive the points or miles as described above based on each customer's individual activity.

None of these programs provide customers with the opportunity to win amounts greater than what has been spent on an individual basis. Thus, customers are not provided with the anticipation or excitement of possibly being awarded substantial prizes or amounts greater than their own purchases. While customers may appreciate the existence of current programs, they do not have incentives to increase their activity with the organizations offering the award program.

Similarly, other reward systems may offer customers a single month wherein any purchase—if made at a precise moment—could be free. However, although these programs provide a potential benefit to customers, the programs do not create excitement that would motivate customers to make additional purchases merely for the chance to win the award because the likelihood of winning is largely attenuated.

There is therefore a need for a system and method for rewarding customers in a manner that creates the possibility of receiving not just a fixed percentage of their personal transactions, but of winning a substantially greater reward. There is also a need for a system and method for rewarding customers that occurs at frequent, regular intervals, not just annual, seasonal, or ad hoc periods. In particular, there is a need for a system and method for administration of a rewards program that generates excitement and "buzz" by offering customers regular opportunities to win award values greater than each individual customer's transactions. The present invention is directed toward meeting these needs.

SUMMARY OF THE INVENTION

For these reasons, it is an object of the present invention to provide an awards program that creates excitement, entertainment, and anticipation for customers. More specifically, a system and method is provided for rewarding customers by creating the possibility of winning high-value awards, substantially greater than each individual customer's transactions. It is a further object of the present invention to provide a system and method for rewarding customers at frequent, regular intervals, thereby adding excitement and anticipation for each award period. It is yet another goal of the present invention to provide a system and method for rewarding customers in a manner that generates enthusiasm and customer loyalty on a national scale, reaching a high customer volume.

To meet these objectives and goals, the present invention provides a random entertaining card usage reward program for those involved. In its most basic terms, this involves the periodic award of prizes to a defined customer group, based upon a defined award criteria. In order to provide additional anticipation and excitement, the award criteria may be based upon some measure of account activity.

The method of the present invention includes the initial step of acquiring or defining a customer group. As an example, the customer group may include the holders of a particular credit card, the holders of a retail loyalty card (clothing stores, gas stations, resorts, etc.), or members of travel groups, such as airline frequent travelers and hotel preferred customers. The process of defining the particular customer group depends on the sponsoring organization or the incentives sought by the customers. For instance, if the sponsoring organization is an airline, the customer group may include frequent fliers of the airline who apply for a credit card, where the credit card offers airline points, or miles, that are redeemable with the sponsoring organization.

Once the customer group is identified and defined, the method of the present invention stores and aggregates customer transaction activity information for an interval of predetermined length, where the transaction activity information includes the number of entries for each customer. The number of entries may be calculated a number of ways, such as being proportional to the number of transactions or the dollar amount of the transactions for a customer. At the completion of a defined time period, a winner is selected from the eligible customers using a predetermined criteria. The method also includes the step of calculating the award amount based on the net transaction revenue generated from the customer portfolio. The reward may be granted as either cash, credit, or products/services. Cash and credit rewards may be presented in either a lump sum or installments at the discretion of the rewards program operator.

DETAILED DESCRIPTION OF PREFERRED EMBODIMENTS

As described above, the present invention provides excitement and anticipation for customers by offering the opportunity to receive a substantial award. Further, the opportunity is recurring, which creates continuous excitement for as long as the customers remain involved with the program. The system and award program of the present invention are also capable of being tailored toward a specific industry or customer base to ensure that the awards are appealing to the targeted customer group.

Figure 1:
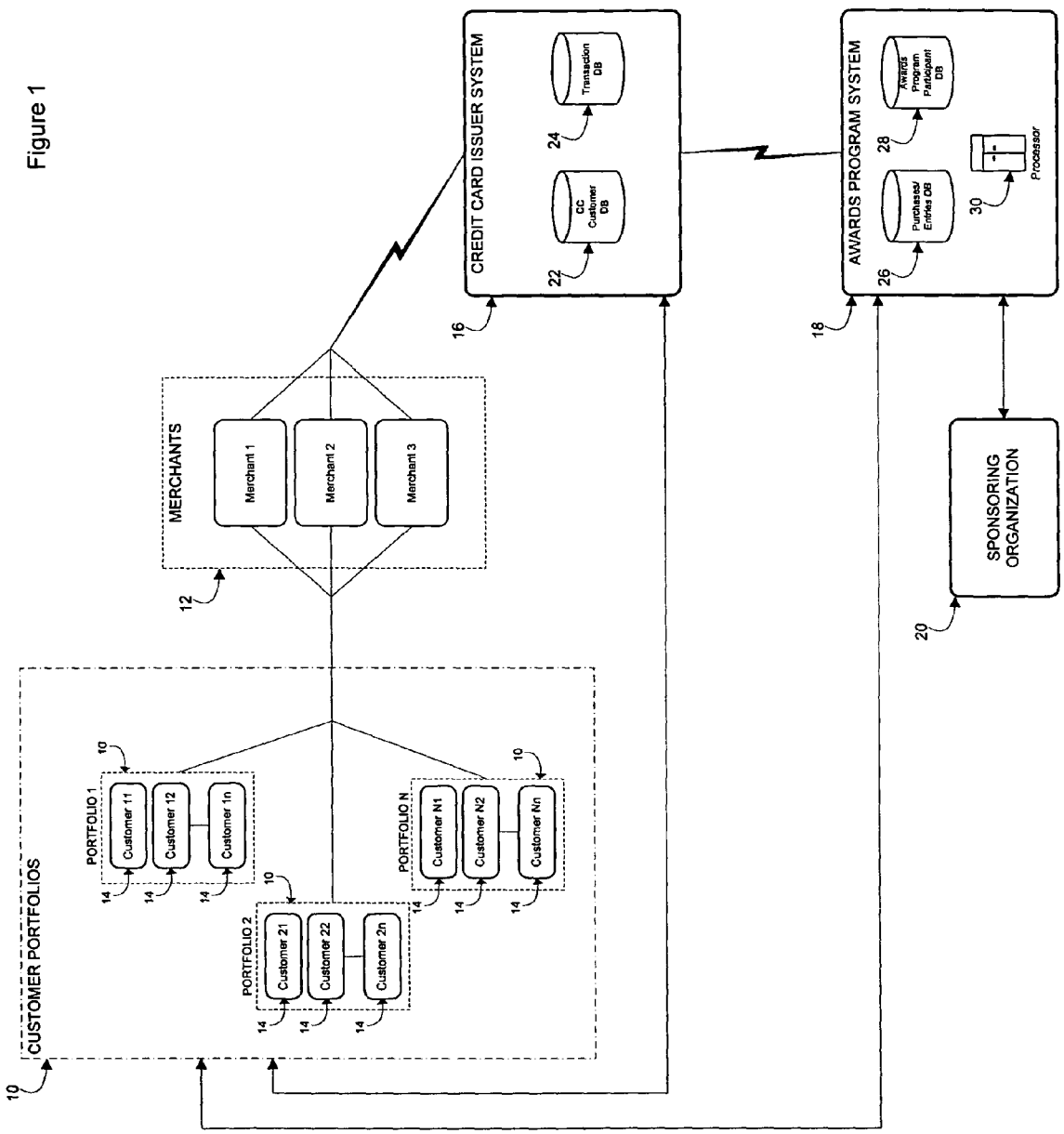
FIG. 1 is a schematic block diagram illustrating the information flow between parties according to the present invention.

FIG. 1 illustrates the information flow between the relevant parties according to one embodiment of the present invention. A plurality of portfolios 10 each include a plurality of customers 14. Each portfolio 10 includes a group of customers with some common interest or association. Often a sponsoring organization 20 could offer an awards program to its members, and a portfolio 10 might include members of the sponsoring organization 20. For example, a credit card could be offered by a charitable or educational organization, where all customers in a particular portfolio 10 are interested in supporting the organization. Similarly, the participants in a frequent flyer program, or frequent customers at a retail establishment, could be defined as another portfolio 10. The system can operate with only one portfolio 10 or with multiple portfolios 10.

The activities of each customer 14 are monitored and stored by an awards program system 18 as described in more detail herein. In the credit card context, the customers 14 complete transactions with a plurality of merchants 12 via common point-of-sale terminals, which collect transaction data and transmit the data to a credit card issuer system 16. The credit card issuer system 16 uses a transaction database 24 to store the transaction data and uses the transaction data to manage the customer accounts, which are stored in a credit card customer database 22.

Relevant portions of the customer information and transaction data are provided to the awards program system 18 for purposes of managing and administering the awards program. The awards program system 18 maintains account information for each customer 14 in an awards program participant database 28. The information received from the credit card issuer system 16 may include customer 14 identification information, dollar amounts charged during a predetermined period, and customer eligibility information. The transaction information is stored by the awards program system 18 in a purchases/entries 26 database.

Processor 30 of the awards program 18 determines an award amount and an award winner from the eligible customers 14 based on predetermined criteria. The awards program system 18 then provides award notification and/or payment information to the appropriate customer 14. The awards program system 18 may also provide such information to the credit card issuer system 16 and sponsoring organization 20 where appropriate.

Figure 2:
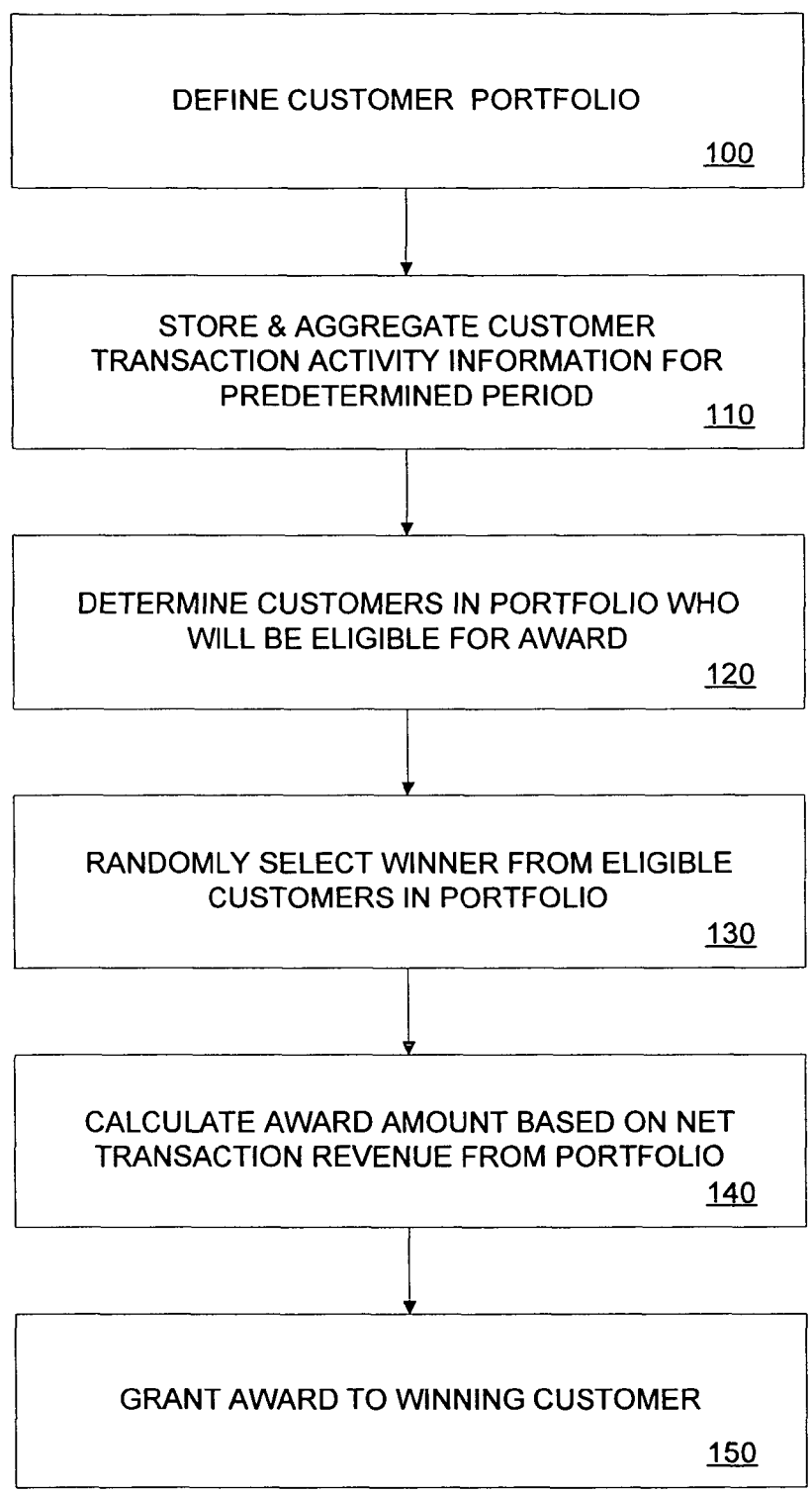
FIG. 2 is a flow chart illustrating the steps used to implement the method of the present invention.

With the system architecture described above, the operation of the system is now explained. Referring now to FIG. 2, the method of the present invention first defines customer portfolios, step 100. A sponsoring organization 20 may engage the awards program system 18 to administer an awards program. In conjunction with a credit card issuer system 16, such as a banking institution, the awards program system 18 offers credit cards to potential customers, who then open credit card accounts with the credit card issuer 16. The appropriate customer 14 personal information, credit information, and account information is stored in the credit card customer database 22 of the credit card issuer system 16. Because the act of opening an awards program credit card makes the customer 14 an awards program participant, the awards program system 18 will also store the necessary customer 14 information in the awards program participant database 28.

The participating customers may be acquired through both traditional and non-traditional credit card acquisition channels, customer group enrollment, existing customer groups, in store sign-ups, etc. These channels may include, but are not limited to: direct mail, telemarketing, print advertisements (e.g. inserts, "take ones"), electronic advertisements (e.g., Internet, television), public relations, event marketing, call center transfer programs, branches, and agents. Additionally, targeted marketing toward predetermined groups or organizations (both existing and new) may be undertaken. As is well-known, potential customers may be rejected from an awards-program card based on a variety factors, such as bankruptcy score, risk score, demographic credit bureau information, and behavior screens.

At step 110, customer activity is tracked. Customers 14 who sign up for the awards program conduct credit card transactions with merchants 12 via common point-of-sale terminals, which collect transaction data and transmit the data to the credit card issuer system 16 during a predetermined period. The customer transaction activity information is stored in the transaction database 24 as the information is received by the credit card issuer system 16 from the merchant 12. Typically this information is transmitted electronically from the merchant 12 to the credit card issuer system 16.

Once the appropriate information is received and processed by the credit card issuer system 16, a subset of that information is sent electronically from the credit card issuer system 16 to the awards program system 18. The customer transaction activity information that is transmitted from the credit card issuer system 16 to the awards program system 18 may include a customer's 14 individual transaction immediately after completion, each customer's 14 transaction revenues for the entire predetermined period, or the net transaction revenues of all customers within a portfolio 10 for the predetermined period. The predetermined period may be as long or short as desired; it is the regularly-occurring nature of the award that creates anticipation by participating customers. Typically, this predetermined period will be consistent with the time period used for mailing account statements to participating customers. As is appreciated by credit card users, this is typically done monthly. The customer transaction activity information received by the awards program system 18 is stored in the purchases/entries database 26 and, if necessary, associated with the appropriate customers in the awards program participant database 28.

In step 120, at the conclusion of the predetermined period, the awards program system 18 determines which customers 14 are eligible to win the award based on customer standing. The customers' eligibility may depend on a variety of factors. For instance, the group of eligible customers may include those customers who completed transactions during the predetermined period; there may also be a minimum threshold above which a customer's transaction revenues must total for eligibility. Alternatively, the group of eligible customers may include all customers except those who have a negative account status, are delinquent or in default, or have had no activity for the relevant period. The sponsoring organization may establish any criteria to determine customer eligibility, and eligibility requirements are easily designed and implemented depending on the desires of the sponsoring organization.

In step 130, the processor 30 of the awards program system 18 selects a winning customer from among the eligible customers for the predetermined time period. In selecting a winning customer, several mechanisms may be implemented. For example, each eligible customer may be assigned an equal probability of being selected as the winner. Alternatively, each eligible customer may be assigned a weighted probability of being selected as the winner that is proportionally based on that customer's activity for the relevant period. For instance, each dollar spent may constitute an "entry" ($1=1 entry) such that each "entry" constitutes an opportunity to win. In that case, a customer who spent $500 during a period would have twice the probability of winning than a customer who spent $250 during that period. Alternatively, each customer may automatically receive one "entry" per period, with each dollar spent being an additional entry.

In one embodiment where participating credit cards are implemented, the processor 30 determines the total number of eligible customers and identifies those customers (designated as $C_1, C_2, C_3 \ldots C_n$, where n= total number of eligible customers). Next, all of the purchases (P) and returns (R) conducted with the participating credit cards are monitored for each customer. The net purchases (NP) are then calculated for each eligible customer:

$$NP_x = \Sigma P_x - \Sigma R_x \text{ (for customer } C_x, \text{ where } C_x \text{ is one of the customers } C_1 \ldots C_n)$$

The Net Purchases for customer $C_x$ is then rounded to the nearest dollar. The process of calculating Net Purchases is performed for each individual customer, $C_1 \ldots C_n$. Based on each calculated "Net Purchases," the customers are then assigned one entry (E) for each NP dollar calculated. Thus, $|E_x|=|NP_x|$ for customer $C_x$. Next, the total entries for all customers during the predetermined time period are calculated:

$$\text{Total Entries} = \sum_{n=1}^{n} E_n$$

In order to determine the winning customer, each individual customer is assigned a set of unique entry numbers such that the total number of entry numbers assigned to a customer corresponds to the number of entries for that customer during the predetermined time period. For example, the unique entry numbers may be selected from the range: 0 ... Total Entries−1. The winner is ultimately chosen using a standard random number generator which randomly generates a decimal number (RNDM) between zero (0) and one (1). The winning entry number is determined by:

Winning Number=INT(RNDM*Total Entries)

As shown in the equation above, the winning number will be a randomly generated integer between 0 and the number of total entries less 1. Returning to the flow chart of FIG. 2, in step 140, the amount of the award is determined based on the net transaction revenue from the relevant portfolio. Although this step may be performed by the credit card issuer system 16 or the sponsoring organization 20, it is preferred that the processor 30 of the awards program system 18 perform the step. Upon receiving the customer activity information from the credit card issuer system 16, the processor 30 determines the appropriate award for the portfolio customers.

In one embodiment, the reward may be a straight cash or credit award that is based on a percentage of the net transaction revenue from the winning customer's portfolio during the predetermined period; e.g., if the portfolio conducted transactions amounting to a net revenue of $5,000,000 and the award percentage is 1%, the winning customer is awarded $50,000 in cash or credit. Additionally, the amount awarded may be dispersed to the winner in a lump sum, in installments, or by another method.

In an alternative embodiment, the award may be a product or service provided to the winning customer. For instance, the customer may be awarded products such as consumer electronics or automobiles, or the customer may be awarded points or "miles" for services such as hotel accommodations and air travel. Further, the reward may be a product or service directly related to the winning customer's motivation for enrolling in the program. For example, if the sponsoring organization 20 for the award program is a timeshare company, the winning customer 14 may be awarded free timeshare at a value appropriately based on the net transaction revenue from the portfolio during the predetermined period. If the sponsoring organization 20 is an oil company that offers a credit card through the credit card issuer system 16, the winning customer 14 might be awarded free gas, perhaps for life or at a value appropriately based on the net transaction revenue from the winning customer's portfolio during the predetermined period.

In yet another embodiment, multiple awards may be presented. For example, a first award may be determined as 0.5% of net revenues, while five second prizes of 0.1% each may be awarded; e.g., if the portfolio conducted transactions amounting to a net revenue of $5,000,000 and the first award percentage is 0.5%, the winning customer is awarded $25,000 in cash or credit, while the five second prizes of 0.1%, or $5,000 each in cash or credit. Additionally, the amount awarded may be dispersed to the winner in a lump sum, in installments, or by another method.

Once the winner has been selected, step 130, and the specific award has been determined, step 140, the award is granted to the winning customer 14, step 150. If the award is a lump sum payment to the customer 14, the amount is dispersed to the customer via cash or credit. This amount may be provided either directly from the awards program system 18 to the winning customer 14, or, alternatively, the awards program system 18 may provide the necessary information to the sponsoring organization 20 or the credit card issuer system 16 and allow the winning amount be dispersed from the latter to the winning customer 14. Other attendant actions may accompany the step of granting the award, step 150. For instance, the winning customer or the specific award may be published via media statements.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method for providing a consumer rewards program based upon consumer transactions, the method comprising:
    defining an account portfolio, the account portfolio including a plurality of customers;
    storing transaction information for the plurality of customers covering a predetermined period;
    determining at least one qualifying activity;
    generating a plurality of entries into a contest, wherein the contest provides opportunities for participation by multiple customers by awarding each customer in the account portfolio an entry into the contest for each performance of the at least one qualifying activity;
    selecting a single winning entry from the plurality of contest entries and identifying a winning customer associated with the winning entry;
    determining an award which is proportional to an aggregation of the transaction information for the plurality of customers; and
    presenting the award to the winning customer.

2. The method of claim 1 wherein the plurality of contest entries are carried over to a second predetermined period and are eligible for entry into a second contest.

3. The method of claim 1 wherein each of the plurality of customers has a probability of being selected as the winning customer that is proportional to the qualifying activities performed by that customer during the predetermined period.

4. The method of claim 1 wherein the qualifying activities are purchases and the winning customer is selected from among the plurality of customers who make purchases during the predetermined period.

5. The method of claim 4 wherein the award is a percentage of the aggregation of the dollar amounts spent by the plurality of customers during the predetermined period.

6. The method of claim 5 wherein the award is presented to the winning customer as cash.

7. The method of claim 5 wherein the award is presented to the winning customer as credit.

8. The method of claim 7 wherein the award is credited to a credit card account against which the winning customer makes purchases during the predetermined period.

9. The method of claim 4 wherein the winning customer makes purchases during the predetermined period against a credit card account.

10. The method of claim 9 wherein a sponsoring organization offers the credit card account as an instrument for implementing the consumer rewards program.

11. The method of claim 10 wherein the award presented to the winning customer is a product or service related to an industry of the sponsoring organization.

12. The method of claim 1 wherein the winning customer is selected from among the plurality of customers who perform qualifying activities and have a customer standing that satisfies predetermined criteria.

13. The method of claim 1 wherein the award presented to the winning customer is a product or service.

14. The method of claim 13 wherein the product or service has a value based on a percentage of the aggregation of the dollar amounts spent by the plurality of customers during the predetermined period.

15. The method of claim 1 wherein the at least one qualifying event includes a monetary purchase by one of the customers of a specified dollar amount.

16. The method of claim 15 wherein the specified amount is $1.00.

17. A system for providing a consumer rewards program for consumer transactions, the system comprising:
    a plurality of customers;
    a plurality of merchants, wherein the plurality of customers conduct credit card transactions with the plurality of merchants;
    a credit card authorization system that receives transaction information for the credit card transactions from the plurality of merchants and approves the credit card transactions, wherein the transaction information includes dollar amounts of the credit card transactions; and
    a rewards program system that receives the transaction information for the credit card transactions from the credit card authorization system, wherein the rewards program system stores the transaction information of each of the plurality of customers during a predetermined period, determines at least one qualifying activity, generates a plurality of entries into a combined contest which is available for the plurality of customers, wherein each customer is awarded entries into the contest for each performance of the at least one qualifying activity, selects a winning entry from the plurality of contest entries and identifies the customer correlated with the selected winning entry, determines an award based on an aggregation of the dollar amounts spent by the plurality of customers during the predetermined period, and presents the award to the winning customer.

18. The system of claim 17 wherein the plurality of contest entries are carried over to a second predetermined period and are eligible for entry into a second contest.

19. The system of claim 17 wherein the qualifying activities are purchases and the rewards program system selects the winning customer such that each of the plurality of customers has a probability of being selected as the winning customer that is proportional to the dollar amounts spent by that customer during the predetermined period.

20. The system of claim 17 wherein the qualifying activities are credit card transactions and the winning customer is selected from among the plurality of customers who conduct credit card transactions during the predetermined period.

21. The system of claim 17 wherein the winning customer is selected from among the plurality of customers who have performed the at least one qualifying activity and have a customer standing that satisfies predetermined criteria.

22. The system of claim 17 wherein the award is a percentage of the aggregation of the dollar amounts spent by the plurality of customers during the predetermined period.

23. The system of claim 22 wherein the award is presented to the winning customer as cash.

24. The system of claim 22 wherein the award is presented to the winning customer as credit.

25. The system of claim 24 wherein the award is credited to a credit card account against which the winning customer conducts credit card transactions during the predetermined period.

26. The system of claim 17 wherein the award presented to the winning customer is a product or service.

27. The system of claim 26 wherein the product or service has a value based on a percentage of the aggregation of the dollar amounts spent by the plurality of customers during the predetermined period.

28. The system of claim 17 wherein the winning customer conducts credit card transactions during the predetermined period against a credit card account.

29. The system of claim 28 wherein a sponsoring organization offers the credit card account as an instrument for implementing the consumer rewards program.

30. The system of claim 29 wherein the award presented to the winning customer is a product or service related to an industry of the sponsoring organization.

31. A method for providing a consumer rewards program based upon consumer transactions, the method comprising:

defining an account portfolio, the account portfolio including a plurality of customers;

storing transaction information for each of the plurality of customers, wherein the transaction information describes usage by the plurality of customers during a predetermined period;

determining at least one qualifying activity;

generating a plurality of entries into a contest, wherein each customer in the account portfolio is awarded entries into the contest for each performance of the at least one qualifying activity and wherein the plurality of contest entries includes the combination of all entries awarded to the plurality of customers;

selecting a winning customer from among the plurality of contest entries;

determining an award which is related to the usage by the plurality of customers during the predetermined period; and presenting the award to the winning customer.

32. The method of claim 31 wherein the plurality of contest entries are carried over to a second predetermined period and are eligible for entry into a second contest.

33. The method of claim 31 wherein the qualifying activities are purchases and each of the plurality of customers who made purchases during the predetermined period has a probability of being selected as the winning customer that is proportional to a number of purchases made by that customer during the predetermined period.

34. The method of claim 31 wherein the qualifying activities are purchases and each of the plurality of customers who made purchases during the predetermined period has a probability of being selected as the winning customer that is proportional to an aggregate value of the purchases made by that customer during the predetermined period.

35. The method of claim 31 wherein the award presented to the winning customer is a product or service.

36. The method of claim 31 wherein the winning customer makes purchases during the predetermined period against a credit card account.

37. The method of claim 36 wherein a sponsoring organization offers the credit card account as an instrument for implementing the consumer rewards program.

38. The method of claim 37 wherein the award presented to the winning customer is a product or service related to an industry of the sponsoring organization.

39. The method of claim 31 wherein the award is presented to the winning customer as cash or credit.

40. The method of claim 31 wherein the steps of storing transaction information, selecting the winning customer, and presenting the award occur repeatedly at regular intervals.

* * * * *